United States Patent
Wu

(10) Patent No.: US 12,089,260 B2
(45) Date of Patent: Sep. 10, 2024

(54) RANDOM ACCESS METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 352 days.

(21) Appl. No.: 17/511,244

(22) Filed: Oct. 26, 2021

(65) Prior Publication Data
US 2022/0046720 A1  Feb. 10, 2022

Related U.S. Application Data

(63) Continuation of application No. PCT/CN2019/091373, filed on Jun. 14, 2019.

(51) Int. Cl.
*H04W 74/08* (2024.01)
*H04L 5/00* (2006.01)
(Continued)

(52) U.S. Cl.
CPC ... *H04W 74/0833* (2013.01); *H04W 72/0446* (2013.01); *H04W 72/1273* (2013.01);
(Continued)

(58) Field of Classification Search
CPC ......... H04W 74/0833; H04W 72/0446; H04W 72/1273; H04W 72/23; H04W 74/006;
(Continued)

(56) References Cited

U.S. PATENT DOCUMENTS

2007/0230600 A1* 10/2007 Bertrand ........... H04W 74/0833
375/260
2013/0083753 A1* 4/2013 Lee ....................... H04L 1/0026
370/329
(Continued)

FOREIGN PATENT DOCUMENTS

CN  107210903 A  9/2017
CN  108282901 A  7/2018
(Continued)

OTHER PUBLICATIONS

3GPP TSG RAN WG1 #86bis R1-1904393 X?an, China, Apr. 8-12, 2019 Agenda item: 7.2.1.2 Source: Samsung Title: Procedure for Two-step RACH Document for: Discussion and Decision (Year: 2019).*
(Continued)

*Primary Examiner* — Inder P Mehra
(74) *Attorney, Agent, or Firm* — BAYES PLLC

(57) ABSTRACT

Provided in the embodiments of the present disclosure are a random access method, a terminal device and a network device. The method includes sending, by the terminal device, a first message in a random access procedure to the network device. The first message includes a first random access preamble and a first physical uplink shared channel (PUSCH). The method further includes monitoring, by the terminal device, whether a first random access response (RAR) is sent by the network device within a first RAR window. The first RAR is an RAR of a first type, the first RAR includes a response to the first message, the first RAR is transmitted on a first physical downlink shared channel (PDSCH), the first PDSCH includes at least one RAR of the first type, and the first PDSCH is scheduled by a first physical downlink control channel (PDCCH).

16 Claims, 4 Drawing Sheets

(51) Int. Cl.
| | |
|---|---|
| *H04W 72/0446* | (2023.01) |
| *H04W 72/1273* | (2023.01) |
| *H04W 72/23* | (2023.01) |
| *H04W 74/00* | (2009.01) |
| *H04W 74/0833* | (2024.01) |

(52) U.S. Cl.
CPC ......... *H04W 72/23* (2023.01); *H04W 74/006* (2013.01); *H04W 74/0866* (2013.01)

(58) Field of Classification Search
CPC ............ H04W 74/0866; H04W 74/008; H04L 5/001; H04L 5/0057; H04L 5/0053
USPC ......................................................... 370/329
See application file for complete search history.

(56) References Cited

U.S. PATENT DOCUMENTS

| | | | |
|---|---|---|---|
| 2014/0334448 A1* | 11/2014 | Langereis | H04W 28/18 370/331 |
| 2014/0355539 A1 | 12/2014 | Yang et al. | |
| 2019/0141742 A1 | 5/2019 | Zhou et al. | |
| 2020/0245361 A1* | 7/2020 | Xiong | H04W 74/006 |
| 2021/0289548 A1* | 9/2021 | Murray | H04W 72/23 |

FOREIGN PATENT DOCUMENTS

| | | |
|---|---|---|
| EP | 2632211 B1 | 8/2017 |
| EP | 2797377 B1 | 5/2018 |
| WO | 2018088422 A1 | 5/2018 |
| WO | 2018127240 A1 | 7/2018 |

OTHER PUBLICATIONS

First Office Action issued in corresponding European application No. 19933128.1, mailed Dec. 14, 2022.
First Office Action issued in corresponding Chinese application No. 202111022084.5, mailed Jan. 19, 2023.
First Office Action issued in corresponding Japanese application No. 2021-572907, mailed Apr. 14, 2023.
Second Office Action issued in corresponding Chinese application No. 202111022084.5, mailed Apr. 15, 2023.
Second Office Action issued in corresponding European application No. 19933128.1, mailed Jun. 2, 2023.
Decision of Rejection issued in corresponding Chinese application No. 202111022084.5, mailed Jun. 29, 2023.
Nokia et al., "On 2-step RACH Procedure", R1-1906747, 3GPP TSG RAN WG1 #97 Reno, USA, May 13-17, 2019.
OPPO, "On Procedure for 2-step Rach", R1-1906581, 3GPP TSG RAN WG1 #97 Reno, USA, May 13-17, 2019.
Extended European Search Report issued in corresponding European Application No. 19933128.1, mailed Mar. 4, 2022, 7 pages.
First Office action issued in corresponding India Application No. 202117046827, mailed Mar. 22, 2022, 6 pages.
"Further considerations on 2-step RACH", Agenda Item: 11.2.1.1, Souce: MediaTek Inc., 3GPP TSG-RAN WG2 Meeting #103bis, R2-1813965, Chengdu, China, Oct. 8-12, 2018, 7 pages.
Decision of Refusal issued in corresponding Japanese Application No. 2021-572907, dated Oct. 27, 2023, 8 pages.
Communication pursuant to Article 94(3) EPC issued in corresponding European Application No. 19933128.1, dated Sep. 26, 2023, 8 pages.
International Search Report issued in corresponding International Application No. PCT/CN2019/091373, mailed Mar. 12, 2020, 31 pages.
PCT Written Opinion of the International Searching Authority issued in corresponding International Application No. PCT/CN2019/091373, mailed Mar. 12, 2020, 6 pages.
"Procedure for Two-step RACH", Agenda item: 7.2.1.2, Source: Samsung, 3GPP TSG RAN WG1 #96bis, R1-1904393, Xi'an, China, Apr. 8-12, 2019, 5 pages.
"Summary of 7.2.1.2 Procedure for Two-step RACH", Agenda Item: 7.2.1.2, Source: Zte, 3GPP TSG RAN WG1 #96, R1-1903436, Athens, Greece, Feb. 25-Mar. 1, 2019, 12 pages.
"2-step RACH procedure", Agenda item: 7.2.1.2, Source: Motorola Mobility, Lenovo, 3GPP TSG RAN WG1 #97, R1-1907238, Reno, USA, May 13-17, 2019, 3 pages.
"Feature lead summary#2 on 2 step RACH procedures", Agenda item: 7.2.1.2, Source: Nokia, Nokia Shanghai Bell, 3GPP TSG RAN WG1 #97, R1-1907838, Reno, USA, May 13-17, 2019, 56 pages.
"On recognition of msgB or msg2", Agenda Item: 11.13.5, Source: Fujitsu, 3GPP TSG-RAN WG 2 Meeting #106, R2-1906257, Reno, USA, May 13-17, 2019, 3 pages.

\* cited by examiner

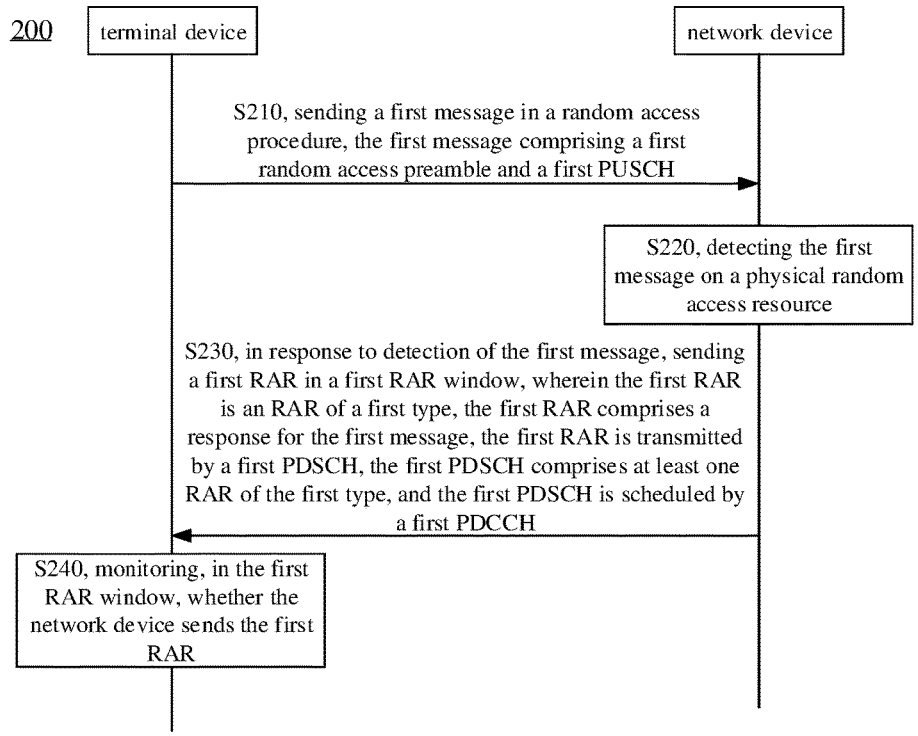
Fig. 4
| RAPID | R | TA command | UE ID | PUCCH resource indication information | PUCCH power control command word | first feedback time indication information | at least part of contents in MSG A | Padding |
Fig. 5
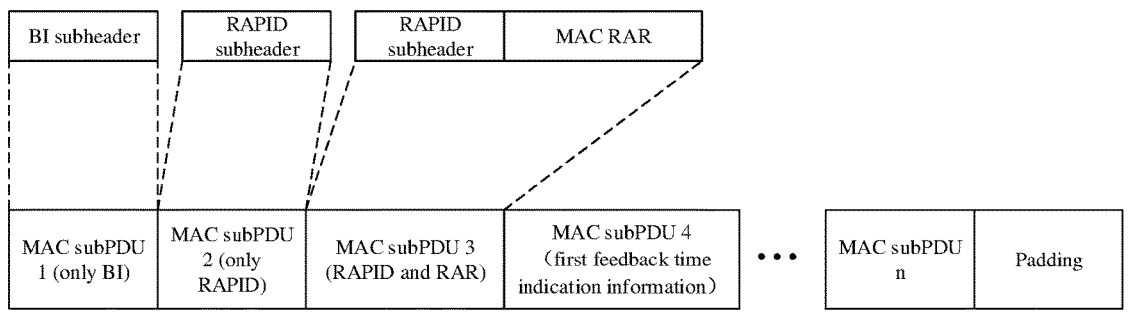
Fig. 6
| RAPID | R | TA command | UE ID | PUCCH resource indication information | PUCCH power control command word | at least part of contents in MSG A | Padding |
Fig. 7

RANDOM ACCESS METHOD, TERMINAL DEVICE AND NETWORK DEVICE

CROSS-REFERENCE TO RELATED APPLICATION

This application is a continuation of International Application No. PCT/CN2019/091373, field on Jun. 14, 2019, the entire contents of which are hereby incorporated by reference.

BACKGROUND

Embodiments of the present disclosure relate to the field of communication, and more particularly, to a random access method, a terminal device, and a network device.

Two-step random access may be supported in a New Radio (NR) system. In a two-step random access procedure, Message 1 (Msg 1) and Message 3 (Msg 3) in a four-step random access procedure may be sent as a first message or Message A (Msg A) in the two-step random access procedure, and Message 2 (Msg 2) and Message 4 (Msg 4) in the four-step random access procedure may be sent as a second message or Message B (Msg B) in the two-step random access procedure. However, Msg B may include random access response messages for a plurality of random access preambles. How a terminal device responds to Msg B is an urgent problem to be solved.

SUMMARY

Embodiments of the present disclosure provide a random access method, a terminal device, and a network device. When an MSG B includes random access response messages for a plurality of random access preambles, the terminal device may determine an uplink resource for sending an response message based on indication information included in the MSG B, and may further confirm that a two-step random access procedure is completed by sending the response message.

In a first aspect, there is provided a random access method, including sending, by a terminal device, a first message in a random access procedure to a network device, wherein the first message includes a first random access preamble and a first physical uplink shared channel (PUSCH); and monitoring, by the terminal device, whether a first random access response (RAR) is sent by the network device within a first RAR window, wherein the first RAR is an RAR of a first type, the first RAR includes a response to the first message, the first RAR is transmitted on a first physical downlink shared channel (PDSCH), the first PDSCH includes at least one RAR of the first type, and the first PDSCH is scheduled by a first physical downlink control channel (PDCCH).

It should be noted that each RAR of the at least one RAR of the first type may be directed to one terminal device or one random access preamble. A RAR of the first type is a response to a two-step random access procedure.

Optionally, the first PDSCH includes first indication information, or the first PDCCH includes the first indication information, wherein the first indication information is configured for use by the terminal device to send a first response message for the first RAR.

In a second aspect, there is provided a random access method, including detecting, by a network device on a physical random access resource, a first message sent by a terminal device, wherein the first message includes a first random access preamble and a first PUSCH; and in response to the detection of the first message, sending, by the network device, a first RAR to the terminal device within a first RAR window, wherein the first RAR is an RAR of a first type, the first RAR includes a response to the first message, the first RAR is transmitted on a first PDSCH, the first PDSCH includes at least one RAR of the first type, and the first PDSCH is scheduled by a first PDCCH.

Optionally, the first PDSCH includes first indication information, or the first PDCCH includes the first indication information, wherein the first indication information is configured for use by the terminal device to send a first response message for the first RAR.

In a third aspect, there is provided a terminal device for executing the method in the first aspect or in each implementation thereof.

Specifically, the terminal device includes a functional module configured to execute the method in the first aspect or each implementation thereof.

In a fourth aspect, there is provided a network device for executing the method in the second aspect or in each implementation thereof.

Specifically, the network device includes a functional module configured to execute the method in the second aspect or each implementation thereof.

In a fifth aspect, there is provided a terminal device including a processor and a memory, wherein the memory is configured to store a computer program, and the processor is configured to call and run the computer program stored in the memory to execute the method in the first aspect or in each implementation thereof.

In a sixth aspect, there is provided a network device including a processor and a memory, wherein the memory is configured to store a computer program, and the processor is configured to call and run the computer program stored in the memory to execute the method in the second aspect or in each implementation thereof.

In a seventh aspect, there is provided an apparatus configured to implement the method in any one of the first aspect to the second aspect or each implementation thereof.

Specifically, the apparatus includes a processor, configured to call and run a computer program from a memory, so that a device installed with the apparatus executes the method in any one of the first aspect to the second aspect or each implementation thereof.

In an eighth aspect, is provided a computer-readable storage medium for storing a computer program, wherein the computer program causes a computer to execute the method in any one of the first aspect to the second aspect or each implementation thereof.

In a ninth aspect, there is provided a computer program product including a computer program instruction, wherein the computer program instruction causes a computer to execute the method in any one of the first aspect to the second aspect or each implementation thereof.

In a tenth aspect, there is provided a computer program, wherein the computer program is configured, when running on a computer, to cause the computer to execute the method in any one of the first aspect to the second aspect or each implementation thereof.

Through the above technical solutions, the first PDSCH may include at least one RAR of the first type, and the terminal device may send the first response message for the first RAR based on the first indication information included in the first PDSCH or the first PDCCH. That is, when an MSG B includes at least one RAR of the first type, the terminal device may determine an uplink resource for sending the first response message based on the first indication information included in the MSG B, and may further confirm that the two-step random access procedure is completed by sending the first response message.

BRIEF DESCRIPTION OF THE DRAWINGS

FIG. 4 is a schematic flowchart of a random access method provided by an embodiment of the present disclosure.

FIG. 5 is a schematic diagram of an MAC subPDU provided by an embodiment of the present disclosure.

FIG. 6 is a schematic diagram of another MAC PDU provided by an embodiment of the present disclosure.

FIG. 7 is a schematic diagram of another MAC subPDU provided by an embodiment of the present disclosure.

DETAILED DESCRIPTION

The technical solutions in embodiments of the present disclosure will be described below in conjunction with the drawings in embodiments of the present disclosure. Obviously, the described embodiments are part of embodiments of the present disclosure, rather than all of them. For the embodiments in the present disclosure, all the other embodiments obtained by those of ordinary skill in the art without creative labor fall within the protection scope of the present disclosure.

Embodiments of the present disclosure may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Universal Mobile Telecommunication System (UMTS), Wireless Local Area Networks (WLAN), Wireless Fidelity (WiFi), a Next-generation communication system or other communication systems, etc.

Generally speaking, traditional communication systems support limited numbers of connections and are easy to implement. However, with a development of communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc. Embodiments of the present disclosure may also be applied to these communication systems.

Optionally, a communication system in embodiments of the present disclosure may be applied to a Carrier Aggregation (CA) scenario, also to a Dual Connectivity (DC) scenario, and further to a Standalone (SA) networking scenario.

Embodiments of the present disclosure do not limit frequency spectrum to be applied. For example, embodiments of the present disclosure may be applied to licensed frequency spectrum, and may also be applied to unlicensed frequency spectrum.

Figure 1:
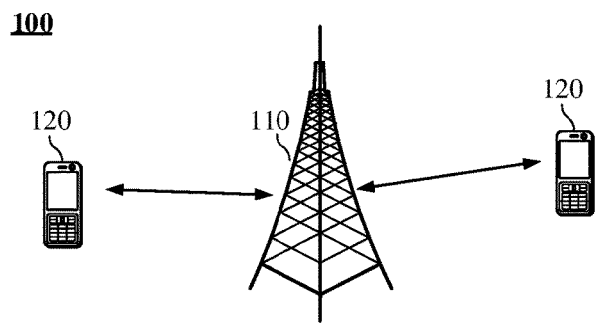
FIG. 1 is a schematic diagram of a communication system architecture provided by an embodiment of the present disclosure.

Exemplarily, a communication system 100 applied in embodiments of the present disclosure is illustrated in FIG. 1. The communication system 100 may include a network device 110, which may be a device in communication with a terminal device 120 (or referred to as a communication terminal or a terminal). The network device 110 may provide communication coverage for a specific geographic area, and may communicate with the terminal device located in the coverage area.

FIG. 1 exemplarily illustrates one network device and two terminal devices. Optionally, the communication system 100 may include a plurality of network devices, and coverage of each network device may include other number of terminal devices, wherein embodiments of the present disclosure are not limited in this regard.

Optionally, the communication system 100 may also include other network entities such as a network controller, a mobile management entity, etc., and embodiments of the present disclosure are not limited in this regard.

It should be understood that a device with communication function in the network/system according to embodiments of the present disclosure may be referred to as a communication device. Taking the communication system 100 illustrated in FIG. 1 as an example, the communication device may include a network device 110 and a terminal 120 with communication function, and the network device 110 and the terminal 120 may be the specific devices described above, which will not be elaborated here. The communication device may also include other devices in the communication system 100, including other network entities such as a network controller, a mobile management entity, etc., and embodiments of the present disclosure are not limited in this regard.

It should be understood that the terms "system" and "network" are often used interchangeably herein. The term "and/or" herein is only to describe a kind of association relationship among associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

Embodiments of the present disclosure are described in combination with the terminal device and the network device, where the terminal device may also be referred to as a User device (UE), an access terminal, a user unit, a user station, a mobile station, a mobile platform, a remote station, a remote terminal, a mobile device, a user terminal, a terminal, a wireless communication device, a user agent or a user apparatus etc. The terminal device may be a STAION (ST) in WLAN, may be a cellular phone, a cordless phone, a Session Initiation Protocol (SIP) phone, a Wireless Local Loop (WLL) station, a personal digital assistant (PDA) device, a handheld device with wireless communication function, a computing device, or other processing devices connected to wireless modems, an in-vehicle device, a wearable device, and a next-generation communication system, such as a terminal device in NR network or a terminal device in future evolved Public Land Mobile Network (PLMN) network, etc.

As an example but not a limitation, in embodiments of the present disclosure, the terminal device may also be a wearable device. The wearable device, also referred to as a wearable intelligent device, is a general term for those wearable devices developed by applying wearable technology to intelligently design daily wear, such as glasses, gloves, watches, clothing, and shoes. The wearable device is a kind of portable device directly worn on body or integrated into user's clothes or accessories. The wearable device is not only a kind of hardware device, but also realizes powerful functions through software support, data interaction, and cloud interaction. Generalized wearable intelligent devices include devices such as intelligent watches or intelligent glasses, etc. that are full-featured and large-sized and may realize all or part of functions without relying on intelligent phones, and devices such as all kinds of intelligent bracelets, intelligent jewelry, etc. for physical sign monitoring that only focus on a certain type of application function and need to cooperate with other devices such as the intelligent phones for use.

The network device may be a device used for communicating with the mobile device. The network device may be an Access Point (AP) in WLAN, a Base Transceiver Station (BTS) in GSM or CDMA, may also be a NodeB (NB) in WCDMA, may further be an Evolutional Node B (eNB or eNodeB) in LTE, or a relay station or an access point, or an in-vehicle device, a wearable device and a terminal device in the NR network, or a terminal device in the future evolved PLMN network, etc.

In embodiments of the present disclosure, the network device provides services for a cell, and the terminal device communicates with the network device through a transmission resource (for example, a frequency domain resource or a frequency spectrum resource) used by the cell. The cell may a cell corresponding to the network device (such as a base station). The cell may belong to a macro base station or a base station corresponding to a Small cell. The Small cell here may include a Metro cell, a Micro cell, a Pico cell, a Femto cell, etc. These Small cells have characteristics such as small coverage and low transmission power, and are suitable for providing high-rate data transmission services.

In a 5-Generation (5G) system, a random access procedure adopts a four-step procedure similar to LTE.

In a first step, the terminal device sends a random access preamble (message 1 or MSG1) to the base station (gNB).

In a second step, after the random access preamble sent by the terminal device is detected by the base station, the base station sends a random access response (RAR, that is, message 2 or MSG 2) to the terminal device, so as to inform the terminal device of the uplink resource information that can be used when sending an MSG 3. Then, a temporary Radio Network Temporary Identity (RNTI) is allocated to the terminal device, and the terminal device is provided with a Timing Advance (TA) command, etc. If the RAR is not detected by the terminal device within the RAR window, the terminal device retransmits a Physical Random Access Channel (PRACH) sequence. If the RAR is detected by the terminal device within the RAR window, the terminal device transmits the MSG 3 based on an uplink grant (UL grant) indicated by the RAR.

In a third step, the terminal device sends an MSG 3 message in the uplink resource specified by the RAR after receiving the RAR. The step allows a Hybrid Automatic Repeat reQuest (HARQ) retransmission.

In a fourth step, the base station sends an MSG 4 message including a contention resolution message to the terminal device. The step allows HARQ retransmission. The terminal device detects whether the MSG 4 includes proprietary information of the terminal device, when the MSG 4 sent by the base station is received by the terminal device. If it is included, it indicates that the random access procedure of the terminal device is successful; otherwise, it is considered that the random procedure fails, and the terminal device needs to initiate the random access procedure again from the first step.

In the MSG 2 of the four-step random access procedure, the RAR sent by the base station to the terminal device is a response to the MSG 1. The Random Access RNTI (RA-RNTI) used by the base station when sending the RAR is calculated based on a position of a time-frequency resource of the PRACH. A PDSCH corresponding to a PDCCH of a RA-RNTI scrambling code may include responses to a plurality of preambles.

There are the following cases when the RAR is not detected by the terminal device, where: the PDCCH of the RA-RNTI scrambling code is not detected; the PDCCH of the RA-RNTI scrambling code is detected, but the corresponding PDSCH is not correctly received; and the PDSCH is received, but an RAR message corresponding to the MSG1 is not included in the PDSCH.

It should be noted that detection of the RAR by the terminal device may be understood as follows: the PDSCH scheduled by the PDCCH of the RA-RNTI scrambling code was correctly received by the terminal device within the RAR window based on the RA-RNTI calculated from the position of the time-frequency resource sending the MSG 1, and the PDSCH includes the RAR message corresponding to the MSG 1.

The PDCCH of the RA-RNTI scrambling code and the PDSCH scheduled by the PDCCH are detected by the terminal device. The PDSCH includes at least one RAR message, one of which is a response to the preamble sent by the terminal device. Each RAR message includes a preamble ID, a TA, a UL grant, a Temporary Cell RNTI (TC-RNTI) and other information. The UL grant includes the following scheduling information: a frequency domain hopping flag, a frequency domain resource allocation, a time domain resource allocation, a Modulation and Coding Scheme (MCS), Transmission Power Control (TPC), and a Channel State Information (CSI) request.

If the RAR is detected within the RAR window, the terminal device transmits the MSG 3 based on the UL grant included in the RAR message.

Specifically, a Media Access Control Protocol Data Unit (MAC PDU) includes one or more Media Access Control sub Protocol Data Unit (MAC subPDU). One MAC subPDU may have only a Backoff Indicator (BI), or only a Random Access Preamble ID (RAPID), or an RAPID and a Media Access Control Random Access Response (MAC RAR).

Figure 2:
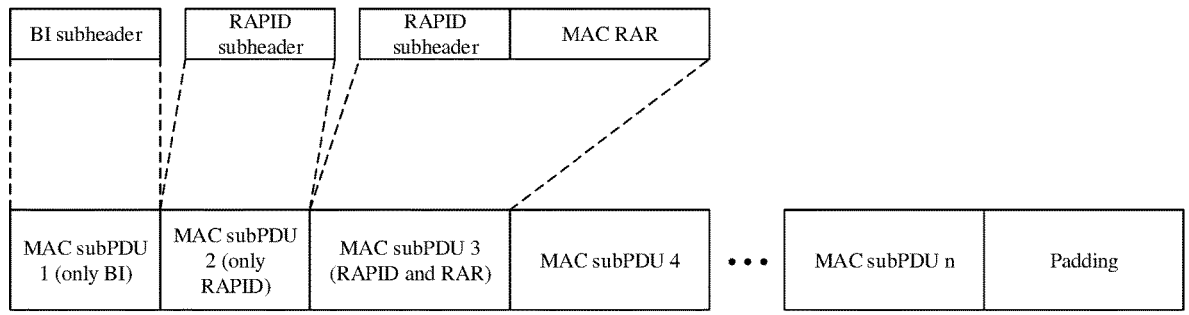
FIG. 2 is a schematic diagram of an MAC PDU provided by an embodiment of the present disclosure.

An example of the MAC PDU can be specifically illustrated in FIG. 2.

Figure 3:
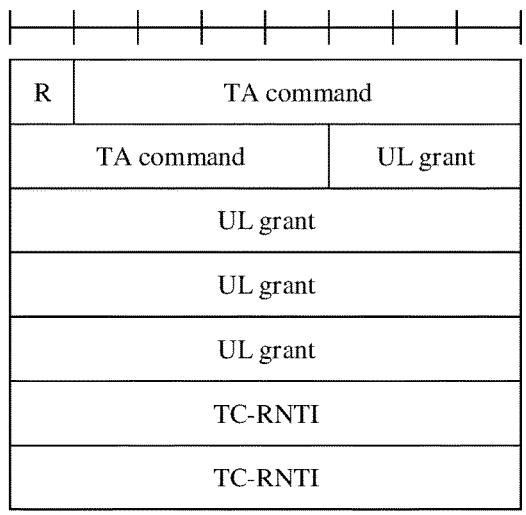
FIG. 3 is a schematic diagram of an MAC RAR provided by an embodiment of the present disclosure.

The size of each MAC RAR is fixed, as specifically illustrated in FIG. 3, and consists of the following parts: R, a reserved bit, set to "0"; TA command, 12 bits; UL Grant, 27 bits; and TC-RNTI, 16 bits.

The 27-bit UL grant in each MAC RAR specifically includes information illustrated in Table 1 below.

TABLE 1

| RAR Grant Domain | Number of bit(s) |
| --- | --- |
| frequency domain hopping flag | 1 |
| frequency domain resource allocation of PUSCH | 14 |
| time domain resource allocation of PUSCH | 4 |
| MCS | 4 |
| TPC command for PUSCH | 3 |
| CSI request | 1 |

In the MSG 3 of the four-step random access procedure, the version number of a Redundancy Version (RV) used for an MSG 3 transmission scheduled by the UL grant in the RAR is 0. If the MSG 3 is not successfully received by the base station, the base station uses a DCI format 0_0 of a TC-RNTI scrambling code to schedule retransmission of the MSG 3.

The DCI format 0_0 of the TC-RNTI scrambling code includes the following contents: Downlink Control Information (DCI) indication (1 bit), frequency domain resource allocation (whose size is determined based on a bandwidth of a UL Band Width Part (BWP)), time domain resource allocation (4 bits), frequency domain hopping flag (1 bit), MCS (5 bits), new data indication (1 bit reserved), RV version (2 bits), HARQ process number (4 bits reserved), PUSCH power control command word (2 bits), and uplink (UL)/Supplementary uplink (SUL) carrier indication (1 bit).

In the MSG 4 of the four-step random access procedure, the terminal device carries out Physical Uplink Control Channel (PUCCH) feedback after receiving the Msg4. If a decoding result of the MSG 4 received by the terminal device is Negative Acknowledgement (NACK), the base station will then carry out the HARQ retransmission for the MSG 4. The base station will use a Cell RNTI (C-RNTI) or a DCI format 1_0 of the TC-RNTI scrambling code to schedule an initial transmission or a retransmission of the MSG 4.

If the DCI format 1_0 of a C-RNTI scrambling code and its corresponding PDSCH are received by the terminal device, the random access is completed. If the DCI format 1_0 of the TC-RNTI scrambling code and its corresponding PDSCH are received and compared successfully in content by the terminal device, the random access is completed.

The DCI format 1_0 of the TC-RNTI scrambling code includes the following contents: DCI indication (1 bit), frequency domain resource allocation (whose size is determined based on the bandwidth of DL BWP), time domain resource allocation (4 bits), VRB to PRB mapping (1 bit), MCS (5 bits), new data indication (1 bit), RV version (2 bits), HARQ process number (4 bits), downlink assignment index (DAI) (2 bits reserved), PUCCH power control command word (2 bits), PUCCH resource indication (3 bits), and PDSCH-to-HARQ feedback timing indication (3 bits).

It should be noted that time delay of the four-step random access procedure is relatively large, which is inappropriate for ultra-reliable and low latency scenarios in 5G and for communication applications on the unlicensed frequency spectrum. In NR, considering characteristics of ultra-reliable and low latency related services and the unlicensed frequency spectrum, a two-step random access procedure is introduced, which may reduce access time delay compared with the four-step random access procedure.

In simple terms, the two-step random access procedure is equivalent to merging the first step and the third step of the four-step random access procedure into a first step (MSG A) of the two-step random access procedure, and merging the second step and the fourth step of the four-step random access procedure into a second step (MSG B) of the two-step random access procedure. Therefore, in the first step of the two-step random access, the terminal device needs to send the preamble and the PUSCH.

In the four-step random access procedure, the MSG 4 includes the PDSCH scheduled by a DL grant of the TC-RNTI or the C-RNTI scrambling code. The terminal device performs decoding feedback of the PDSCH based on the PUCCH resource indicated in the DL grant corresponding to the MSG 4, after receiving the MSG 4. In the two-step random access procedure, the MSG 1 and the MSG 3 are merged into the MSG A of the two-step random access, the MSG 2 and the MSG 4 are merged into the MSG B of the two-step random access, and a response mode of the MSG B may be enhanced based on an existing RAR response mode. That is, the MSG B may include response messages for a plurality of preambles or a plurality of terminal devices or a plurality of PUSCHs. In this procedure, responses of the MSG B in the two-step random access procedure need to be redesigned.

Based on the above technical problems, embodiments of the present disclosure provide a random access method. When the MSG B includes response message(s) for at least one preamble or at least one terminal device or at least one PUSCH, the terminal device may determine the uplink resource for sending the response message with respect to the MSG B based on indication information included in the MSG B, and may further confirm that the two-step random access procedure is completed by sending the response message.

A random access solution proposed by the present disclosure to solve the above technical problems is described in detail below.

FIG. 4 is a schematic flowchart of a random access method 200 provided by an embodiment of the present disclosure. As illustrated in FIG. 4, the method 200 may include part or all of the following contents.

In S210, a terminal device sends a first message in a random access procedure to a network device, where the first message includes a first random access preamble and a first PUSCH.

In S220, the network device detects, on a physical random access resource, the first message sent by the terminal device;

In S230, when the first message is detected, the network device sends a first RAR to the terminal device within a first RAR window, where the first RAR is an RAR of a first type, the first RAR includes a response to the first message, the first RAR is transmitted on a first PDSCH, the first PDSCH includes at least one RAR of the first type, and the first PDSCH is scheduled by a first PDCCH.

In S240, the terminal device monitors whether the first RAR is sent by the network device within the first RAR window.

That is, the terminal device cannot determine whether the first message is correctly received by the network device after sending the first message. Therefore, the terminal device monitors whether the first RAR is sent by the network device within the first RAR window.

Optionally, the above physical random access resource may include two parts of resources, one for transmitting the first random access preamble, and the other for transmitting the first PUSCH.

It should be noted that if the first random access preamble and the first PUSCH are detected by the network device, it can be considered that the first message is detected by the network device.

Optionally, if only the first random access preamble is detected by the network device, the network device may send a second RAR to the terminal device within a second RAR window, where the second RAR is an RAR of a second type, the second RAR includes a response to the first random access preamble, the second RAR is transmitted on a second PDSCH, the second PDSCH includes at least one RAR of the second type, and the second PDSCH is scheduled by a second PDCCH. Accordingly, the terminal device may send an MSG 3 to the network device based on an uplink grant (UL grant) included in the second RAR after receiving the second RAR.

It should be noted that each RAR of the at least one RAR of the first type may be directed to one terminal device or one random access preamble. Similarly, each RAR of the at least one RAR of the second type may be directed to one random access preamble. The RAR of the first type is a response to a two-step random access procedure, and the RAR of the second type is a response to the random access preamble of the two-step random access procedure. Optionally, the two-step random access procedure may back off to a four-step random access procedure. That is, the RAR of the second type may be the RAR of the same type as the RAR of the four-step random access procedure.

Optionally, the first PDSCH includes first indication information, or the first PDCCH includes the first indication information, where the first indication information is configured for use by the terminal device to send a first response message for the first RAR. That is, the first indication information may be transmitted on the PDSCH. For example, the first PDSCH includes the first indication information. The first indication information may also be transmitted on the PDCCH. For example, the first PDCCH includes the first indication information.

Specifically, when the first RAR is detected by the terminal device within the first RAR window, the terminal device sends the first response message for the first RAR based on the first indication information.

Optionally, the first response message includes ACK information. That is, the terminal device may confirm that the two-step random access procedure of the terminal device is completed by sending the first response message. The network device may confirm that the two-step random access procedure of the terminal device is completed after receiving the first response message. Optionally, the first response message does not include NACK information.

It should be noted that, for the terminal device, if the first RAR is received, it means that the first message is correctly received by the network device, and the terminal device can also acquire first uplink resource information (for example, first PUCCH resource information) corresponding to the first RAR. Therefore, the terminal device needs to send ACK information on the first PUCCH resource corresponding to the first RAR, so as to complete the random access procedure. If the first RAR is not received by the terminal device, it means that the terminal device cannot acquire the PUCCH resource corresponding to the first RAR. Therefore, the terminal device does not need to feedback the corresponding uplink response information. That is, the first response message does not include NACK information.

It should be noted that the first indication information may be indication information exclusive to the terminal device. That is, each RAR of the first type among the at least one RAR of the first type may correspond to a respective first indication information. The first indication information may also be common indication information. That is, the at least one RAR of the first type share(s) the same first indication information. Of course, when the first indication information includes a plurality of indication information, part of them may be the common indication information and part of them may be the indication information exclusive to the terminal device. Accordingly, the first indication information may be transmitted entirely by the first PDSCH, or entirely by the first PDCCH, or partially by the first PDSCH and partially by the first PDCCH, which is not limited in the present disclosure.

Optionally, the first response message is transmitted based on at least one of the following scrambling codes: the first random access preamble, the first PUSCH, a UE ID of the terminal device, and the TC-RNTI or the C-RNTI.

Thus, the network device may determine that the random access procedure of the terminal device is completed after receiving the first response message.

Optionally, in embodiments of the present disclosure, the first indication information is associated with at least one of the following: the first random access preamble, the first PUSCH, and the User Equipment Identifier (UE ID) of the terminal device. Thus, the terminal device may determine the first indication information for itself among a plurality of first indication information.

Optionally, the first PUSCH may specifically refer to an antenna port corresponding to the first PUSCH, or a generation parameter of the scrambling code used in transmission of the first PUSCH. For example, the generation parameter of the scrambling code used in transmission of the first PUSCH includes a parameter P, and the corresponding generation parameter of the scrambling code when the terminal device sends the first response message also includes the parameter P.

Optionally, in embodiments of the present disclosure, the first indication information includes at least one of the following: first uplink resource indication information, first feedback timing indication information, a first Channel State Information (CSI) request, first uplink sub-band indication information, first uplink Band Width Part (BWP) indication information, a first Downlink assignment index (DAI) and/or packet index.

When the first indication information includes at least the first uplink resource indication information, the first uplink resource indication information is used by the terminal device to determine a first uplink resource carrying the first response message. When the first RAR is detected by the terminal device within the first RAR window, the terminal device may determine the first uplink resource based on the first uplink resource indication information, and send the first response message for the first RAR on the first uplink resource.

Optionally, the first uplink resource indication information includes at least one PUCCH resource indication information or at least one PUSCH resource indication information. That is, the first uplink resource may be a PUCCH resource or a PUSCH resource.

When the first indication information includes at least the first feedback timing indication information, the first feedback timing indication information is used by the terminal device to determine a time domain position of the first uplink resource carrying the first response message. When the first RAR is detected by the terminal device within the first RAR window, the terminal device may determine the time domain position of the first uplink resource based on the first feedback timing indication information, and send the first response message for the first RAR on the time domain position of the first uplink resource.

It should be noted that the first feedback timing indication information may be the indication information exclusive to the terminal device or the common indication information. For example, the first feedback timing indication information determines that the timing is K, the terminal device receives the RAR in the time slot n, and then the terminal device sends the first response message in the time slot n+K.

When the first indication information includes at least the first CSI request, the first CSI request is used for requesting the terminal device to report the CSI. When the first RAR is detected by the terminal device within the first RAR window, the terminal device may report the CSI based on the first CSI request.

When the first indication information includes at least the first uplink sub-band indication information, the first uplink sub-band indication information is used by the terminal device to determine a frequency domain position of the first uplink resource carrying the first response message. For example, unlicensed frequency spectrum includes a plurality of uplink sub-bands, and the first uplink sub-band indication information may be used for indicating which sub-band(s) include(s) the first uplink resource. When the first RAR is detected by the terminal device within the first RAR window, the terminal device may determine the frequency domain position of the first uplink resource based on the first uplink sub-band indication information, and send the first response message for the first RAR on the frequency domain position of the first uplink resource.

When the first indication information includes at least the first uplink BWP indication information, the first BWP indication information is used by the terminal device to determine the BWP of the first uplink resource. When the first RAR is detected by the terminal device within the first RAR window, the terminal device may determine the BWP corresponding to the first uplink resource based on the first uplink BWP indication information, and send the first response message for the first RAR by the first uplink resource on the BWP.

When the first indication information includes at least a first power control command word, the first power control command word is used by the terminal device to determine transmission power of the first response message. When the first RAR is detected by the terminal device within the first RAR window, the terminal device may determine the transmission power of the first response message based on the first power control command word, and send the first response message for the first RAR based on the determined transmission power of the first response message.

For example, the first power control command word may be a PUSCH power control command word, and the first power control command word is specifically used by the terminal device to determine the transmission power when sending the first response message on the PUSCH resource.

As another example, the first power control command word may be a PUCCH power control command word, and the first power control command word is specifically used by the terminal device to determine the transmission power when sending the first response message on the PUCCH resource.

When the first indication information includes at least the first DAI and/or packet index, the first DAI and/or packet index is used by the terminal device to determine a HARQ codebook sending the first response message. When the first RAR is detected by the terminal device within the first RAR window, the terminal device may determine the HARQ codebook sending the first response message based on the first DAI and/or packet index, and send the first response message for the first RAR based on the determined HARQ codebook sending the first response message.

Optionally, the packet index may be used for determining a group identification fed back by the HARQ corresponding to the first response message.

Optionally, in embodiments of the present disclosure, the first RAR in the first PDSCH includes the first indication information. Optionally, the first RAR also includes at least one of the following: the UE ID, a TA command, the TC-RNTI or the C-RNTI, and part or all of contents included in the first PUSCH.

In embodiments of the present disclosure, one MAC PDU includes one or more MAC subPDU(s), and one MAC subPDU may have only a Backoff Indicator (BI), or only an RAPID, or the RAPID and an MAC RAR.

Optionally, the MAC RAR corresponding to the RAR of the first type has a fixed size. For example, the MAC RAR includes at least one of the following contents: the UE ID, the TA command, the TC-RNTI or the C-RNTI, the first feedback timing indication information, the PUCCH resource indication information, the PUCCH power control command word, and part or all of contents included in the PUSCH of the MSG A.

Optionally, when the MAC RAR includes the TC-RNTI, the MAC RAR also includes part or all of the contents included in the PUSCH of the MSG A. Alternatively, when the MAC RAR includes the C-RNTI, the MAC RAR does not include part or all of the contents included in the PUSCH of the MSG A.

Optionally, in embodiments of the present disclosure, the first indication information may be the indication information exclusive to the terminal device. That is, each RAR of the first type among the at least one RAR of the first type may correspond to a respective first indication information. The first indication information may also be the common indication information. That is, the at least one RAR of the first type share(s) the same first indication information. Of course, when the first indication information includes a plurality of indication information, part of them may be the common indication information and part of them may be the indication information exclusive to the terminal device.

The first indication information will be described below with reference to two specific examples.

Optionally, as a first example, the first indication information is the indication information exclusive to the terminal device. Specifically, the MAC PDU including the RAR of the first type may be illustrated in FIG. 2. That is, the MAC PDU including the RAR of the first type may be the same as that in the existing solution. Furthermore, the MAC subPDU 3 illustrated in FIG. 2 may include at least part of contents illustrated in FIG. 5. That is, the first indication information specifically includes at least part of the contents illustrated in FIG. 5.

It should be noted that an arrangement order of the indication information included in FIG. 5 is schematic, and does not constitute a limitation to the arrangement order of the indication information.

Therefore, while sending the response of the MSG B to a plurality of MSG A by using one PDSCH, the network device may allocate a first indication information for sending the first response message in each MSG B, and the first indication information includes a plurality of indication information with different functions. Thus, different terminal devices may determine corresponding response resources based on the random access preamble or the PUSCH or the UE ID sent by the same PDSCH after receiving the same PDSCH.

Optionally, as a second example, when the first indication information includes a plurality of indication information, part of them may be the common indication information and part of them may be the indication information exclusive to the terminal device. The MAC PDU including the RAR of the first type may be illustrated in FIG. 6, where the MAC PDU 4 includes the common indication information (for example, the first feedback timing indication information) corresponding to the at least one RAR of the first type. Furthermore, the MAC subPDU 3 illustrated in FIG. 6 may include at least part of contents illustrated in FIG. 7. That is, the first indication information specifically includes at least part of the contents illustrated in FIG. 7 and the first feedback timing indication information.

It should be noted that the arrangement order of the MAC subPDU or the indication information included in FIG. 6 or FIG. 7 is schematic, and does not constitute a limitation to the arrangement order of the MAC subPDU or the indication information.

Since the first PDSCH includes at least one RAR of the first type, a resource for sending the first response message corresponding to the at least one RAR of the first type may be re-using the uplink resource included in the same time slot. That is, the feedback timing indication information corresponding to the at least one RAR of the first type is the same. Therefore, the first feedback timing indication information may be the common indication information.

Optionally, in embodiments of the present disclosure, the first indication information includes indication information about a channel access type and/or a channel access priority, configured for use by the terminal device to determine a channel access procedure corresponding to transmission of the first response message.

For example, in an unlicensed frequency spectrum solution, the terminal device needs to send signals based on Listen Before Talk (LBT). Specifically, the terminal device needs to carry out channel listening before sending signals on a channel of the unlicensed frequency spectrum, and only when a channel listening result shows that the channel is idle, the terminal device may send the signals. If the channel listening result shows that the channel is busy, the terminal device may not send the signals. That is, in the unlicensed frequency spectrum solution, the terminal device needs to know the channel access type and/or the channel access priority, in order to carry out the channel listening and send signals. The first indication information includes the indication information about the channel access type and/or the channel access priority, so that the terminal device may determine the channel access procedure corresponding to transmission of the first response message based on the indication information about the channel access type and/or the channel access priority.

Optionally, the channel access type includes at least one of the following: a Cat-1 channel access type, a Cat-2 channel access type, and a Cat-4 channel access type, where the Cat-2 channel access type includes channel access type with a first gap and/or channel access type with a second gap.

For example, the channel access type with the first gap includes a channel access type with a length of 25 μs, and the channel access type with the second gap includes a channel access type with a length of 16 μs.

Optionally, there may be the following three channel access types (Category, Cat) as commonly used during the LBT process of a communication device: Cat-1 LBT, transmitting immediately after the end of switching gap; Cat-2 LBT, single time slot detection, also referred to as LBT without random back off; and Cat-4 LBT, LBT with random fall back based on variable Contention Window Size (CWS).

Specific applicable conditions of the Cat-1 LBT, the Cat-2 LBT, and the Cat-4 LBT may refer to existing technology or evolution technology of the existing technology, which will not be described here again for brevity.

Optionally, when the channel access type is the Cat-4 channel access type, the channel access priority may be further distinguished based on a priority of a transmission service, and the first indication information may include a value indicating the channel access priority under the Cat-4, such as P in Table 2. Table 2 is an example about channel access parameters corresponding to different channel access priorities under the Cat-4. The smaller the value of p, the higher the channel access priority.

TABLE 2 channel access parameters corresponding to different channel access priorities under the Cat-4

| channel access priority (p) | $m_p$ | $CW_{min,p}$ | $CW_{max,p}$ | $T_{mcot,p}$ | Allowed $CW_p$ value |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It should be noted that in the above Table 2, $m_p$ refers to the number of backoff time slots corresponding to the channel access priority p, $CW_p$ refers to the contention window size corresponding to the channel access priority p, $CW_{min,p}$ refers to a minimum value of the $CW_p$ corresponding to the channel access priority p, $CW_{max,p}$ refers to a maximum value of the $CW_p$ corresponding to the channel access priority p, and $T_{mcot,p}$ refers to a maximum channel occupancy time length corresponding to the channel access priority p.

Optionally, in embodiments of the present disclosure, the first indication information includes at least one of the following: at least two uplink BWP indication information, at least two uplink sub-band indication information, at least two uplink resource indication information, at least two feedback timing indication information, and at least two power control command words.

Taking an application on the unlicensed frequency spectrum as an example, the first indication information includes the at least two uplink BWP indication information. Thus, the terminal device may determine at least two uplink BWPs based on the at least two uplink BWP indication information. Furthermore, the terminal device may determine the BWP(s) with idle channel(s) among the at least two uplink BWPs based on the channel listening result, so as to increase an opportunity for transmission on the uplink BWP(s). Similarly, the first indication information includes the at least two uplink sub-band indication information. Thus, the terminal device may determine at least two uplink sub-bands based on the at least two uplink sub-band indication information. Further, the terminal device may determine the sub-band(s) with the idle channel(s) among the at least two uplink sub-bands, so as to increase an opportunity for transmission on the uplink sub-band(s). Similarly, the first indication information includes the at least two uplink resource indication information, so that the terminal device may determine at least two uplink resources based on the at least two uplink resource indication information. Further, the terminal device may determine the uplink resource(s) with the idle channel(s) among the at least two uplink resources, so as to increase an opportunity for transmission on the uplink resource(s). Similarly, the first indication information includes the at least two feedback timing indication information, so that the terminal device may determine at least two feedback time based on the at least two feedback timing indication information. Further, the terminal device may determine the feedback time with the idle channel(s) among the at least two feedback time, so as to increase an opportunity for uplink feedback. Similarly, the first indication information includes the at least two power control command words, so that the terminal device may determine at least two transmission power based on the at least two power control command words. Further, the terminal device may select different transmission power based on different uplink resources, so as to complete transmission of the first response message.

Optionally, in embodiments of the present disclosure, the first PDCCH includes second indication information used by the terminal device to send a second response message for the first PDSCH. That is, the terminal device may send the second response message for the first PDSCH to the network device based on the second indication information.

For example, when the first PDSCH is not successfully received by the terminal device, the terminal device sends the second response message (such as the NACK information) for the first PDSCH to the network device.

Optionally, the second indication information includes at least one of the following: second uplink resource indication information, second feedback timing indication information, second uplink sub-band indication information, second uplink BWP indication information, a second power control command word, a second DAI and/or packet index.

When the second indication information includes at least the second uplink resource indication information, the second uplink resource indication information is used by the terminal device to determine a second uplink resource carrying the second response message. When the first PDSCH is not successfully received by the terminal device, the terminal device may determine the second uplink resource based on the second uplink resource indication information, and send the second response message for the first PDSCH on the second uplink resource.

Optionally, the second uplink resource indication information includes at least one PUCCH resource indication information or at least one PUSCH resource indication information. That is, the second uplink resource may be the PUCCH resource or the PUSCH resource.

When the second indication information includes at least the second feedback timing indication information, the second feedback timing indication information is used by the terminal device to determine a time domain position of the second uplink resource carrying the second response message. When the first PDSCH is not successfully received by the terminal device, the terminal device may determine the time domain position of the second uplink resource based on the second feedback timing indication information, and send the second response message for the first PDSCH on the time domain position of the second uplink resource.

When the second indication information includes at least the second uplink sub-band indication information, the second uplink sub-band indication information is used by the terminal device to determine a frequency domain position of the second uplink resource carrying the second response message. When the first PDSCH is not successfully received by the terminal device, the terminal device may determine the frequency domain position of the second uplink resource based on the second uplink sub-band indication information, and send the second response message for the first PDSCH on the frequency domain position of the second uplink resource.

When the second indication information includes at least the second uplink BWP indication information, the second BWP indication information is used by the terminal device to determine the BWP of the second uplink resource carrying the second response message. When the first PDSCH is not successfully received by the terminal device, the terminal device may determine the BWP of the second uplink resource based on the second uplink BWP indication information, and send the second response message for the first PDSCH on the BWP of the second uplink resource.

When the second indication information includes at least the second power control command word, the second power control command word is used by the terminal device to determine transmission power of the second response message. When the first PDSCH is not successfully received by the terminal device, the terminal device may determine the transmission power of the second response message based on the second power control command word, and send the second response message for the first PDSCH based on the determined transmission power of the second response message.

For example, the second power control command word may be the PUSCH power control command word, and the second power control command word is specifically used by the terminal device to determine the transmission power when sending the second response message on the PUSCH resource.

As another example, the second power control command word may be the PUCCH power control command word, and the second power control command word is specifically used by the terminal device to determine the transmission power when sending the second response message on the PUCCH resource.

When the second indication information includes at least the second DAI and/or packet index, the second DAI and/or packet index is used by the terminal device to determine a HARQ codebook sending the second response message. When the first PDSCH is not successfully received by the terminal device, the terminal device may determine the HARQ codebook sending the second response message based on the second DAI and/or packet index, and send the second response message for the first PDSCH based on the determined HARQ codebook sending the second response message.

Optionally, the second response message includes the NACK information. That is, the terminal device may confirm that the first PDSCH is not successfully received by sending the second response message. The network device may retransmit the first PDSCH after receiving the NACK information sent by the terminal device. Optionally, the second response does not include the ACK information.

It should be noted that the second response message is response message directed to the first PDSCH, and the second response message may be used for triggering retransmission of the first PDSCH. For example, if the first PDCCH is successfully received by the terminal device and the second uplink resource (such as the second PUCCH resource) corresponding to the first PDSCH is determined based on the second indication information in the first PDCCH, and if the first PDSCH is not correctly received by the terminal device, then the terminal device may send the NACK information on the second PUCCH resource, so that the network device may retransmit the first PDSCH after receiving the NACK information.

Optionally, the NACK information is transmitted based on a RNTI scrambling code corresponding to the first PDCCH.

It should be understood that the first PDSCH may include response message(s) for one preamble and/or one terminal device, and may also include response messages for a plurality of preambles and/or a plurality of terminal devices. Optionally, when the first PDSCH is correctly received by the terminal device, the terminal device does not need to send the acknowledgement (ACK) information on the second PUCCH resource. This is mainly because when the first PDSCH includes the response messages for a plurality of preambles and/or a plurality of terminal devices, taking two terminal devices as an example, then the two terminal devices need to receive the same first PDSCH. Suppose that one of the terminal devices receives the first PDSCH correctly, and the other terminal device does not receive the first PDSCH correctly. If both terminal devices provide feedback on the first PDSCH, then one terminal device sends the ACK information on the second PUCCH resource corresponding to the first PDSCH, and the other terminal device sends the NACK information on the same second PUCCH resource. The network device cannot determine whether the information sent on the second PUCCH resource is the ACK information or the NACK information, when analyzing the information transmitted on the second PUCCH resource. In order to avoid such situation, the terminal device that fails to analyze may send the NACK information on the corresponding second PUCCH resource to trigger the retransmission of the first PDSCH, and the terminal device that analyzes successfully does not send any information on the corresponding second PUCCH resource. The terminal device that correctly receives the first PDSCH does not need to receive the retransmitted first PDSCH subsequently.

Optionally, the first PDCCH includes new data indicator (NDI) information. The NDI information is used for indicating that a transmission block transmitted in the first PDSCH is a new transmission or a retransmission.

Optionally, the first PDCCH includes redundancy version (RV) information. The RV information is used for indicating the redundancy version corresponding to the transmission block transmitted in the first PDSCH.

It should be understood that the control channel includes the indication information. This may mean that the control information transmitted on the control channel includes the indication information. This may also mean that the indication information is carried in a transmission procedure of the control channel. The present disclosure is not limited in this regard.

Optionally, in embodiments of the present disclosure, the terminal device monitors whether the second RAR is sent by the network device within the second RAR window, where the second RAR is an RAR of a second type, the second RAR includes a response to the first random access preamble, the second RAR is transmitted on the second PDSCH, the second PDSCH includes at least one RAR of the second type, and the second PDSCH is scheduled by a second PDCCH.

Accordingly, the network device sends the second RAR to the terminal device within the second RAR window, when the first random access preamble is detected but the first PUSCH is not detected, where the second RAR is the RAR of the second type, the second RAR includes the response to the first random access preamble, the second RAR is transmitted on the second PDSCH, the second PDSCH includes at least one RAR of the second type, and the second PDSCH is scheduled by the second PDCCH.

In embodiments of the present disclosure, the second RAR window and the first RAR window may be the same window or different windows. For example, there is no overlapping area between the second RAR window and the first RAR window. As another example, there is an overlapping area between the second RAR window and the first RAR window. As still another example, the second RAR window completely overlaps the first RAR window. That is, the second RAR window and the first RAR window are the same window.

For example, both the second RAR window and the first RAR window are 10 ms.

Optionally, the first PDSCH corresponds to a first RNTI, the second PDSCH corresponds to a second RNTI, and determination parameters of the first RNTI and the second RNTI are different.

Optionally, in embodiments of the present disclosure, the second response message is transmitted based on one of the following scrambling codes: the first RNTI or the second RNTI.

Optionally, the first RAR and the second RAR include indication information of the RAR type. Alternatively, the first PDSCH and the second PDSCH include indication information of the RAR type. Further alternatively, the first PDCCH and the second PDCCH include indication information of the RAR type.

Optionally, the indication information of the RAR type may be 1-bit explicit indication information. For example, a bit value of 1 indicates that the corresponding RAR is a RAR of the first type, and the bit value of 0 indicates that the corresponding RAR is a RAR of the second type.

Optionally, in embodiments of the present disclosure, the first PDSCH includes at least one RAR of the second type, or the second PDSCH includes at least one RAR of the first type. In other words, one PDSCH may include two types of RAR.

Optionally, the RNTI corresponding to the RAR of the first type and the RNTI corresponding to the RAR of the second type are determined in the same way. Optionally, the RNTI corresponding to the RAR of the first type and the RNTI corresponding to the RAR of the second type are both determined based on the time domain position and the frequency domain position of the Preamble in the MSG A. Optionally, the R in the MAC subPDU is used for distinguishing the RAR of the first type and the RAR of the second type. For example, if the R is set to "1", it means that the corresponding RAR is the RAR of the first type. If the R is set to "0", it means that the corresponding RAR is the RAR of the second type.

Optionally, the RNTI corresponding to the RAR of the first type and the RNTI corresponding to the RAR of the second type are determined in different ways. For example, the RA-RNTI corresponding to the RAR of the second type is determined based on the time domain position and the frequency domain position of the Preamble in the MSG A. The RA-RNTI corresponding to the RAR of the first type is determined based on at least one of the following parameters: the time domain position of the Preamble in the MSG A, the frequency domain position of the Preamble in the MSG A, the ID of the Preamble in the MSG A, the time domain position of the PUSCH in the MSG A, the frequency domain position of the PUSCH in the MSG A, and the antenna port corresponding to the PUSCH in the MSG A.

Optionally, the terminal device determines corresponding response types based on different RNTIs.

In embodiments of the present disclosure, the RAR of the first type may also be referred to as the RAR of a first response format, and the RAR of the second type may also be referred to as the RAR of a second response format.

Therefore, in embodiments of the disclosure, the first PDSCH may include at least one RAR of the first type, and the terminal device may send the first response message for the first RAR based on the first indication information included in the first PDSCH or the first PDCCH. That is, when the MSG B includes at least one RAR of the first type, the terminal device may determine the uplink resource for sending the first response message based on the first indication information included in the MSG B, and confirm that the two-step random access procedure is completed by sending the first response message.

Figure 8:
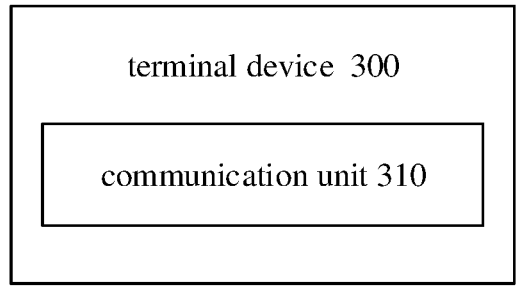
FIG. 8 is a schematic block diagram of a terminal device provided by an embodiment of the present disclosure.

FIG. 8 illustrates a schematic block diagram of a terminal device 300 according to an embodiment of the present disclosure. As illustrated in FIG. 8, the terminal device 300 includes: a communication unit 310, configured to send a first message in a random access procedure to a network device, wherein the first message includes a first random access preamble and a first PUSCH, wherein the communication unit is further configured to monitor whether a first random access response (RAR) is sent by the network device within a first RAR window, wherein the first RAR is an RAR of a first type, the first RAR includes a response to the first message, the first RAR is transmitted on a first PDSCH, the first PDSCH includes at least one RAR of the first type, and the first PDSCH is scheduled by a first PDCCH.

Optionally, the first PDSCH includes first indication information, or the first PDCCH includes the first indication information, wherein the first indication information is used by the terminal device to send a first response message for the first RAR.

Optionally, the first indication information is associated with at least one of following: the first random access preamble, the first PUSCH, and a UE ID of the terminal device.

Optionally, the first indication information includes at least one of following: first uplink resource indication information, used by the terminal device to determine a first uplink resource carrying the first response message; first feedback timing indication information, used by the terminal device to determine a time domain position of the first uplink resource carrying the first response message; CSI request, used for requesting the terminal device to report CSI; first uplink sub-band indication information, used by the terminal device to determine a frequency domain position of the first uplink resource carrying the first response message; first uplink BWP indication information, used by the terminal device to determine BWP of the first uplink resource; first power control command word, used by the terminal device to determine transmission power of the first response message; and first DAI and/or packet index, used by the terminal device to determine a hybrid automatic repeat request (HARD) codebook sending the first response message.

Optionally, the first uplink resource indication information includes at least one PUCCH resource indication information or at least one PUSCH resource indication information.

Optionally, the first indication information includes indication information about a channel access type and/or a channel access priority, used by the terminal device to determine a channel access procedure corresponding to transmission of the first response message.

Optionally, the channel access type includes at least one of following: a Cat-1 channel access type, a Cat-2 channel access type, and a Cat-4 channel access type, wherein the Cat-2 channel access type includes channel access type with a first gap and/or channel access type with a second gap.

Optionally, the first indication information includes at least one of following: at least two uplink BWP indication information, at least two uplink sub-band indication information, at least two uplink resource indication information, at least two feedback timing indication information, and at least two power control command words.

Optionally, the first PDSCH including the first indication information means that the first indication information is included by the first RAR in the first PDSCH.

Optionally, the first RAR further includes at least one of following: a UE ID, a TA command, a TC-RNTI or a C-RNTI, and partial or entire contents included in the first PUSCH.

Optionally, the first response message includes ACK information.

Optionally, the first PDCCH includes second indication information used by the terminal device to send a second response message for the first PDSCH.

Optionally, the second indication information includes at least one of following: second uplink resource indication information, used by the terminal device to determine a second uplink resource carrying the second response message; second feedback timing indication information, used by the terminal device to determine a time domain position of the second uplink resource carrying the first response message; second uplink sub-band indication information, used by the terminal device to determine a frequency domain position of the second uplink resource carrying the second response message; second uplink BWP indication information, used by the terminal device to determine BWP of the second uplink resource carrying the second response message; a second power control command word, used by the terminal device to determine transmission power of the second response message; and a second DAI and/or packet index, used by the terminal device to determine a HARQ codebook sending the second response message.

Optionally, the second response message includes negative acknowledgement (NACK) information.

Optionally, the communication unit is further configured to monitor whether a second RAR is sent by the network device within a second RAR window, wherein the second RAR is an RAR of a second type, the second RAR includes a response to the first random access preamble, the second RAR is transmitted on a second PDSCH, the second PDSCH includes at least one RAR of the second type, and the second PDSCH is scheduled by a second PDCCH.

Optionally, the first PDSCH corresponds to a first RNTI, the second PDSCH corresponds to a second RNTI, and determination parameters of the first RNTI and the second RNTI are different.

Optionally, the first RAR and the second RAR include indication information of the RAR type. Alternatively, the first PDSCH and the second PDSCH include indication information of the RAR type. Further alternatively, the first PDCCH and the second PDCCH include indication information of the RAR type.

Optionally, the first PDSCH includes at least one RAR of the second type, or the second PDSCH includes at least one RAR of the first type.

It should be understood that the terminal device 300 according to embodiments of the present disclosure may correspond to the terminal device in the method embodiments of the present disclosure, and the foregoing and other operations and/or functions of each unit in the terminal device 300 are respectively intended to implement corresponding procedures of the terminal device in the method 200 illustrated in FIG. 4, which will not be described here again for brevity.

Figure 9:
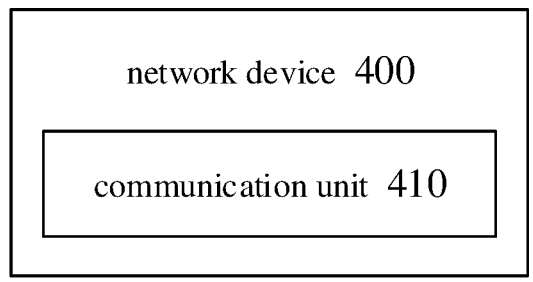
FIG. 9 is a schematic block diagram of a network device provided by an embodiment of the present disclosure.

FIG. 9 illustrates a schematic block diagram of a network device 400 according to an embodiment of the present disclosure. As illustrated in FIG. 9, the network device 400 includes: a communication unit 410, configured to detect, on a physical random access resource, a first message sent by a terminal device, wherein the first message includes a first random access preamble and a first PUSCH; wherein the communication unit 410 is further configured to send a first RAR to the terminal device within a first RAR window when the first message is detected, and wherein the first RAR is an RAR of a first type, the first RAR includes a response to the first message, the first RAR is transmitted on a first PDSCH, the first PDSCH includes at least one RAR of the first type, and the first PDSCH is scheduled by a first PDCCH.

Optionally, the first PDSCH includes first indication information, or the first PDCCH includes the first indication information, wherein the first indication information is used by the terminal device to send a first response message for the first RAR.

Optionally, the first indication information is associated with at least one of following: the first random access preamble, the first PUSCH, and a UE ID of the terminal device.

Optionally, the first indication information includes at least one of following: first uplink resource indication information, used by the terminal device to determine a first uplink resource carrying the first response message; first feedback timing indication information, used by the terminal device to determine a time domain position of the first uplink resource carrying the first response message; first uplink sub-band indication information, used by the terminal device to determine a frequency domain position of the first uplink resource carrying the first response message; a first CSI request, used for requesting the terminal device to report CSI; first uplink BWP indication information, used by the terminal device to determine BWP of the first uplink resource carrying the first response message; a first power control command word, used by the terminal device to determine transmission power of the first response message; and a first DAI and/or packet index, used by the terminal device to determine a HARQ codebook sending the first response message.

Optionally, the first uplink resource indication information includes at least one PUCCH resource indication information or at least one PUSCH resource indication information.

Optionally, the first indication information includes indication information about a channel access type and/or a channel access priority, used by the terminal device to determine a channel access procedure corresponding to transmission of the first response message.

Optionally, the channel access type includes at least one of following: a Cat-1 channel access type, a Cat-2 channel access type, and a Cat-4 channel access type, wherein the Cat-2 channel access type includes channel access type with a first gap and/or channel access type with a second gap.

Optionally, the first indication information includes at least one of following: at least two uplink BWP indication information, at least two uplink sub-band indication information, at least two uplink resource indication information, at least two feedback timing indication information, and at least two power control command words.

Optionally, the first PDSCH including the first indication information means that the first indication information is included by the first RAR in the first PDSCH.

Optionally, the first RAR further includes at least one of following: UE ID, TA command, TC-RNTI or C-RNTI, part or all of contents included in the first PUSCH.

Optionally, the first response message includes ACK information.

Optionally, the first PDCCH includes second indication information used by the terminal device to send a second response message for the first PDSCH.

Optionally, the second indication information includes at least one of following: second uplink resource indication information, used by the terminal device to determine a second uplink resource carrying the second response message; second feedback timing indication information, used by the terminal device to determine a time domain position of the second uplink resource carrying the second response message; second uplink sub-band indication information, used by the terminal device to determine a frequency domain position of the second uplink resource carrying the second response message; second uplink BWP indication information, used by the terminal device to determine BWP of the second uplink resource carrying the second response message; a second power control command word, used by the terminal device to determine transmission power of the second response message; and a second DAI and/or packet index, used by the terminal device to determine a HARQ codebook sending the second response message.

Optionally, the second response message includes NACK information.

Optionally, the communication unit is further configured to send a second RAR to the terminal device within a second RAR window, when the first random access preamble is detected but the first PUSCH is not detected, wherein the second RAR is an RAR of a second type, the second RAR includes a response to the first random access preamble, the second RAR is transmitted on a second PDSCH, the second PDSCH includes at least one RAR of the second type, and the second PDSCH is scheduled by a second PDCCH.

Optionally, the first PDSCH corresponds to a first radio network temporary identification (RNTI), the second PDSCH corresponds to a second RNTI, and determination parameters of the first RNTI and the second RNTI are different.

Optionally, the first RAR and the second RAR include indication information of the RAR type. Alternatively, the first PDSCH and the second PDSCH include indication information of the RAR type. Further alternatively, the first PDCCH and the second PDCCH include indication information of the RAR type.

Optionally, the first PDSCH includes at least one RAR of the second type, or the second PDSCH includes at least one RAR of the first type.

It should be understood that the network device 400 according to embodiments of the present disclosure may correspond to the network device in the method embodiments of the present disclosure, and the foregoing and other operations and/or functions of each unit in the network device 400 are respectively intended to implement corresponding procedures of the network device in the method 200 shown in FIG. 4, which will not be described here again for brevity.

Figure 10:
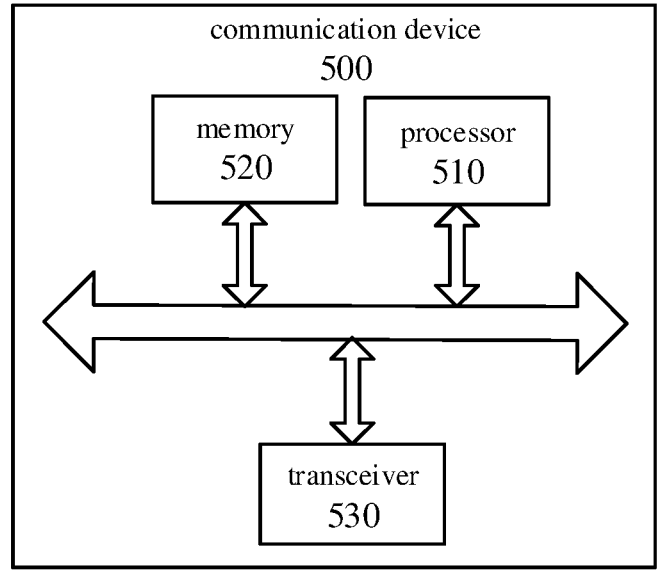
FIG. 10 is a schematic block diagram of a communication device provided by an embodiment of the present disclosure.

FIG. 10 is a schematic structural diagram of a communication device 500 according to an embodiment of the present disclosure. The communication device 500 illustrated in FIG. 10 includes a processor 510, and the processor 510 may call and run a computer program from a memory to implement the method in embodiments of the present disclosure.

Optionally, as illustrated in FIG. 10, the communication device 500 may also include a memory 520, where the processor 510 may call and run a computer program from the memory 520 to implement the method in embodiments of the present disclosure.

The memory 520 may be a separate device independent of the processor 510, and may also be integrated in the processor 510.

Optionally, as illustrated in FIG. 10, the communication device 500 may also include a transceiver 530, and the processor 510 may control the transceiver 530 to communicate with other devices. Specifically, the transceiver 530 may send information or data to other devices, or receive information or data sent by other devices.

The transceiver 530 may include a transmitter and a receiver. The transceiver 530 may further include an antenna, the number of which may be one or more.

Optionally, the communication device 500 may specifically be the network terminal or the base station in embodiments of the present disclosure, and the communication device 500 may implement the corresponding procedures implemented by the network terminal or the base station in each method according to embodiments of the present disclosure, which will not be described here again for brevity.

Optionally, the communication device 500 may specifically be the mobile terminal/terminal device in embodiments of the present disclosure, and the communication device 500 may implement the corresponding procedures implemented by the mobile terminal/terminal device in each method according to embodiments of the present disclosure, which will not be described here again for brevity.

Figure 11:
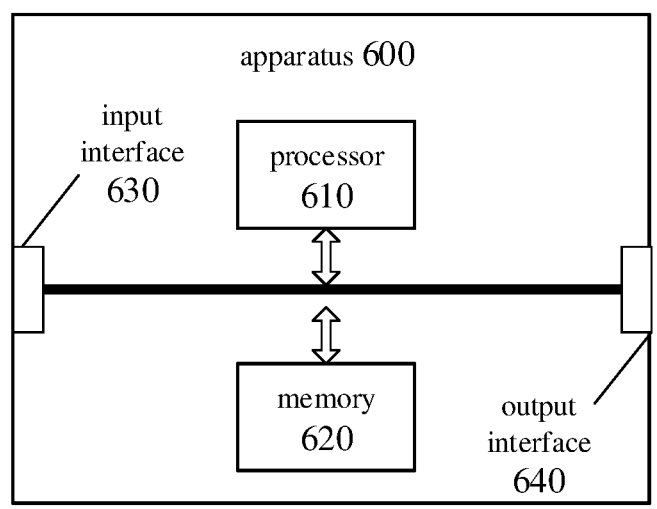
FIG. 11 is a schematic block diagram of an apparatus provided by an embodiment of the present disclosure.

FIG. 11 is a schematic structural diagram of an apparatus according to an embodiment of the present disclosure. The apparatus 600 illustrated in FIG. 11 includes a processor 610, and the processor 610 may call and run a computer program from a memory to implement the method in embodiments of the present disclosure.

Optionally, as illustrated in FIG. 11, the apparatus 600 may also include a memory 620, wherein the processor 610 may call and run a computer program from the memory 620 to implement the method in embodiments of the present disclosure.

The memory 620 may be a separate device independent of the processor 610, and may also be integrated in the processor 610.

Optionally, the apparatus 600 may also include an input interface 630. The processor 610 may control the input interface 630 to communicate with other devices or apparatuses, and specifically, may acquire information or data sent by other devices or apparatuses.

Optionally, the apparatus 600 may also include an output interface 640. The processor 610 may control the output interface 640 to communicate with other devices or apparatuses, and specifically, may output information or data to other devices or apparatuses.

Optionally, the apparatus may be applied to the network device or the base station in embodiments of the present disclosure, and the apparatus may implement the corresponding procedures implemented by the network device or the base station in each method according to embodiments of the present disclosure, which will not be described here again for brevity.

Optionally, the apparatus may be applied to the mobile terminal/terminal device in embodiments of the present disclosure, and the apparatus may implement the corresponding procedures implemented by the mobile terminal/terminal device in each method according to embodiments of the present disclosure, which will not be described here again for brevity Optionally, the apparatus mentioned in embodiments of the present disclosure may also be a chip, for example, a system level chip, a system chip, a chip system or a system-on-chip chip, etc.

Figure 12:
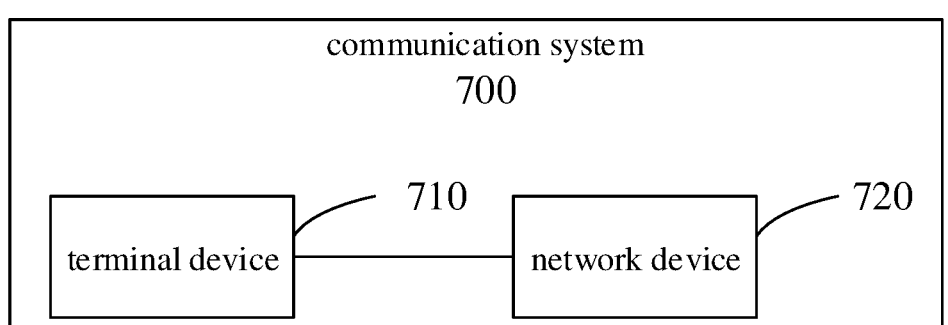
FIG. 12 is a schematic block diagram of a communication system provided by an embodiment of the present disclosure.

FIG. 12 is a schematic block diagram of a communication system 700 according to embodiments of the present disclosure. As illustrated in FIG. 12, the communication system 700 includes a terminal device 710 and a network device 720.

The terminal device 710 may be configured to implement the corresponding functions implemented by the terminal device in the above method, and the network device 720 may be used to implement the corresponding functions implemented by the network device or the base station in the above method, which will not be described here again for brevity.

It should be understood that the processor in embodiments of the present disclosure may be an integrated circuit chip with signal processing capability. In an implementation, each step of the above method embodiments may be implemented by integrated logic circuits of hardware in a processor and/or instructions in form of software. The above processor may be a general-purpose processor, a Digital Signal processor (DSP), an Application Specific Integrated Circuit (ASIC), a Field Programmable Gate Array (FPGA) or other programmable logic devices, discrete gates or transistor logic devices, discrete hardware components, etc., which may implement or execute each method, step and logic block diagram disclosed in embodiments of the present disclosure. The general-purpose processor may be a microprocessor or the processor may also be any conventional processor or the like. The steps of the method disclosed in combination with embodiments of the present disclosure may be directly implemented by a hardware decoding processor, or by a combination of software modules and hardware in the decoding processor. The software module may be located in a mature storage medium of the art, such as a random access memory, a flash memory, a read-only memory, a programmable read-only memory or an electrically erasable programmable memory, a register, etc. The storage medium is located in the memory, and the processor reads information in the memory and completes the steps of the above method in combination with its hardware.

It can be understood that the memory in embodiments of the present disclosure may be a volatile memory or a non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) which serves as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that memories of the system and method described herein are intended to include, but are not limited to these and any other suitable types of memories.

It should be understood that the above memory is exemplary but not restrictive description. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synch link DRAM (SLDRAM), and a Direct Rambus RAM (DR RAM). In other words, the memories in embodiments of the present disclosure are intended to include, but are not limited to these and any other suitable types of memories.

Embodiments of the present disclosure also provide a computer-readable storage medium configured for storing computer programs.

Optionally, the computer-readable storage medium may be applied to the network device or the base station in embodiments of the present disclosure, and the computer program causes the computer to execute the corresponding procedure implemented by the network device or the base station in each method according to embodiments of the present disclosure, which will not be described here again for brevity.

Optionally, the computer-readable storage medium may be applied to the mobile terminal/terminal device in embodiments of the present disclosure, and the computer program causes the computer to execute the corresponding procedure implemented by the mobile terminal/terminal device in each method according to embodiments of the present disclosure, which will not be described here again for brevity Embodiments of the present disclosure also provide a computer program product including a computer program instruction.

Optionally, the computer program product may be applied to the network device or the base station in embodiments of the present disclosure, and the computer program instruction causes the computer to execute the corresponding procedure implemented by the network device or the base station in each method according to embodiments of the present disclosure, which will not be described here again for brevity.

Optionally, the computer program product may be applied to the mobile terminal/terminal device in embodiments of the present disclosure, and the computer program instruction causes the computer to execute the corresponding procedure implemented by the mobile terminal/terminal device in each method according to embodiments of the present disclosure, which will not be described here again for brevity.

The embodiments of the present disclosure also provide a computer program.

Optionally, the computer program may be applied to the network device or the base station in embodiments of the present disclosure, and when the computer program runs on the computer, the computer is caused to execute the corresponding procedure implemented by the network device or the base station in each method according to embodiments of the present disclosure, which will not be described here again for brevity.

Optionally, the computer program may be applied to the mobile terminal/terminal device in embodiments of the present disclosure, and when the computer program runs on the computer, the computer is caused to execute the corresponding procedure implemented by the mobile terminal/ terminal device in each method according to embodiments of the present disclosure, which will not be described here again for brevity.

Those skilled in the art may realize that units and algorithm steps of each example described in combination with embodiments disclosed herein may be implemented by electronic hardware or a combination of computer software and the electronic hardware. Whether these functions are executed by hardware or software depends on specific applications and design constraint conditions of the technical solution. Professionals and technicians may use different methods to implement the described functions for each specific application, but such implementation should not be considered beyond the scope of the present disclosure.

Those skilled in the art can clearly understand that, for the convenience and conciseness of the description, the specific working procedure of the system, apparatus and unit described above may refer to the corresponding procedure in the aforementioned method embodiments, which will not be described here again for brevity.

In several embodiments provided by the present disclosure, it should be understood that the disclosed system, apparatus and method may be implemented in other manners. For example, the apparatus embodiments described above are only schematic. For example, division of the units is merely one kind of logical function division, and there may be other division manners in actual implementation. For example, a plurality of units or components may be combined or integrated in another system, or some features may be omitted or not executed. Furthermore, mutual coupling or direct coupling or a communication connection illustrated or discussed above may be indirect coupling or a communication connection through some interfaces, apparatus or units, and may be electrical, mechanical or other forms.

The units described as separate components may or may not be physically separated, and the component displayed as a unit may or may not be a physical unit. That is, it may be located in one place, or may be distributed on multiple network units. Some or all of the units may be selected according to actual needs to achieve the objectives of the solutions in embodiments.

In addition, each functional unit in each embodiment of the present disclosure may be integrated in one processing unit, or each unit may exist alone physically, or two or more above units may be integrated in one unit.

The functions may be stored in a computer-readable storage medium, if being implemented in the form of a software functional unit and sold or used as an independent product. Based on such understanding, the technical solution according to the present disclosure or the part contributing to the related art or part of the technical solution may essentially be embodied in the form of a software product, and the computer software product is stored in a storage medium including several instructions, such that a computer device (which may be a personal computer, a server, or a network device, etc.) executes all or part of the steps of the method described in each embodiment of the present disclosure. The aforementioned storage medium includes a U disk, a mobile hard disk, a read-only memory (ROM), a random access memory (RAM), a magnetic disk or an optical disk, and other mediums that may store program codes.

The foregoing descriptions are merely specific implementations according to embodiments of the present disclosure, and the protection scope of embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A method for random access, comprising:
sending, by a terminal device, a first message in a random access procedure to a network device, wherein the first message comprises a first random access preamble and a first physical uplink shared channel (PUSCH); and
monitoring, by the terminal device, whether a first random access response (RAR) is sent by the network device within a first RAR window,
wherein the first RAR is an RAR of a first type, the first RAR comprises a response to the first message, the first RAR is transmitted on a first physical downlink shared channel (PDSCH), the first PDSCH comprises at least one RAR of the first type, and the first PDSCH is scheduled by a first physical downlink control channel (PDCCH), and
wherein the method further comprising:
monitoring, by the terminal device, whether a second RAR is sent by the network device within a second RAR window, wherein the second RAR is an RAR of a second type, the second RAR comprises a response to the first random access preamble, the second RAR is transmitted on a second PDSCH, the second PDSCH comprises at least one RAR of the second type, and the second PDSCH is scheduled by a second PDCCH.

2. The method according to claim 1, wherein:
the first RAR in the first PDSCH comprises first indication information, wherein the first indication information is for the terminal device to send a first response message for the first RAR.

3. The method according to claim 2, wherein the first indication information comprises at least one of:
first uplink resource indication information, wherein the first uplink resource indication information is for the terminal device to determine a first uplink resource for carrying the first response message;
first feedback timing indication information, wherein the first feedback timing indication information is for the terminal device to determine a time domain position of the first uplink resource for carrying the first response message; and
a first power control command word, wherein the first power control command word is configured for the terminal device to determine transmission power of the first response message.

4. The method according to claim 2, wherein the first indication information comprises indication information about a channel access type, the channel access type indication information is used by the terminal device to determine a channel access procedure corresponding to transmission of the first response message.

5. The method according to claim 2, wherein the first response message comprises acknowledgement (ACK) information.

6. The method according to claim 1, wherein the second RAR window is the same RAR window as the first RAR window.

7. The method according to claim 1, wherein the first RAR and the second RAR comprise indication information of the RAR type.

8. A method for random access, comprising:
detecting, by a network device on a physical random access resource, a first message sent by a terminal device, wherein the first message comprises a first random access preamble and a first physical uplink shared channel (PUSCH); and
in response to detection of the first message, sending, by the network device, a first random access response (RAR) to the terminal device within a first RAR window,
wherein the first RAR is an RAR of a first type, the first RAR comprises a response to the first message, the first RAR is transmitted on a first physical downlink shared channel (PDSCH), the first PDSCH comprises at least one RAR of the first type, and the first PDSCH is scheduled by a first physical downlink control channel (PDCCH),
wherein the method further comprises:
in response that the first random access preamble is detected but the first PUSCH is not detected, sending, by the network device, a second RAR to the terminal device within a second RAR window,
wherein the second RAR is an RAR of a second type, the second RAR comprises a response to the first random access preamble, the second RAR is transmitted on a second PDSCH, the second PDSCH comprises at least one RAR of the second type, and the second PDSCH is scheduled by a second PDCCH.

9. The method according to claim 8, wherein the first RAR in the first PDSCH comprises first indication information, wherein the first indication information is for the terminal device to send a first response message for the first RAR.

10. The method according to claim 9, wherein the first indication information comprises at least one of:
first uplink resource indication information, for the terminal device to determine a first uplink resource for carrying the first response message;
first feedback timing indication information, for the terminal device to determine a time domain position of the first uplink resource for carrying the first response message; and
a first power control command word, configured for the terminal device to determine transmission power of the first response message.

11. The method according to claim 9, wherein the first indication information comprises indication information about a channel access type, the channel access type indication information is used for the terminal device to determine a channel access procedure corresponding to transmission of the first response message.

12. The method according to claim 9, wherein the first response message comprises acknowledgement (ACK) information.

13. The method according to claim 8, wherein the second RAR window is the same RAR window as the first RAR window.

14. The method according to claim 8, wherein the first RAR and the second RAR comprise indication information of the RAR type.

15. A terminal device, comprising a processor and a memory, wherein:
the memory is configured to store a computer program, and the processor is configured to call and run the computer program stored in the memory to execute a random access method, the random access method comprising:

sending, by the terminal device, a first message in a random access procedure to a network device, wherein the first message comprises a first random access preamble and a first physical uplink shared channel (PUSCH); and monitoring, by the terminal device, whether a first random access response (RAR) is sent by the network device within a first RAR window, wherein the first RAR is an RAR of a first type, the first RAR comprises a response to the first message, the first RAR is transmitted on a first physical downlink shared channel (PDSCH), the first PDSCH comprises at least one RAR of the first type, and the first PDSCH is scheduled by a first physical downlink control channel (PDCCH), and wherein the random access method further comprising:

monitoring, by the terminal device, whether a second RAR is sent by the network device within a second RAR window, wherein the second RAR is an RAR of a second type, the second RAR comprises a response to the first random access preamble, the second RAR is transmitted on a second PDSCH, the second PDSCH comprises at least one RAR of the second type, and the second PDSCH is scheduled by a second PDCCH.

16. A network device, comprising a processor and a memory, wherein:

the memory is configured to store a computer program, and the processor is configured to call and run the computer program stored in the memory to execute a random access method, the random access method comprising:

detecting, by the network device on a physical random access resource, a first message sent by a terminal device, wherein the first message comprises a first random access preamble and a first physical uplink shared channel (PUSCH); and in response to detection of the first message, sending, by the network device, a first random access response (RAR) to the terminal device within a first RAR window, wherein the first RAR is an RAR of a first type, the first RAR comprises a response to the first message, the first RAR is transmitted on a first physical downlink shared channel (PDSCH), the first PDSCH comprises at least one RAR of the first type, and the first PDSCH is scheduled by a first physical downlink control channel (PDCCH), wherein the method further comprises:

in response that the first random access preamble is detected but the first PUSCH is not detected, sending, by the network device, a second RAR to the terminal device within a second RAR window, wherein the second RAR is an RAR of a second type, the second RAR comprises a response to the first random access preamble, the second RAR is transmitted on a second PDSCH, the second PDSCH comprises at least one RAR of the second type, and the second PDSCH is scheduled by a second PDCCH.

* * * * *